March 24, 1925.
T. D. STANLEY
AUTOMOBILE TIRE LOCK
Filed Jan. 12, 1920
1,531,149
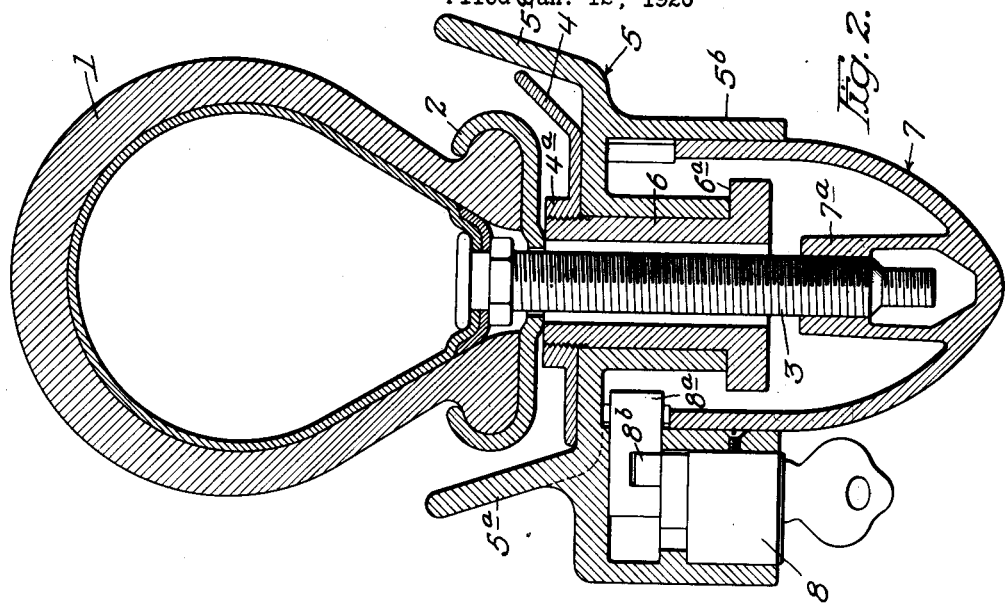
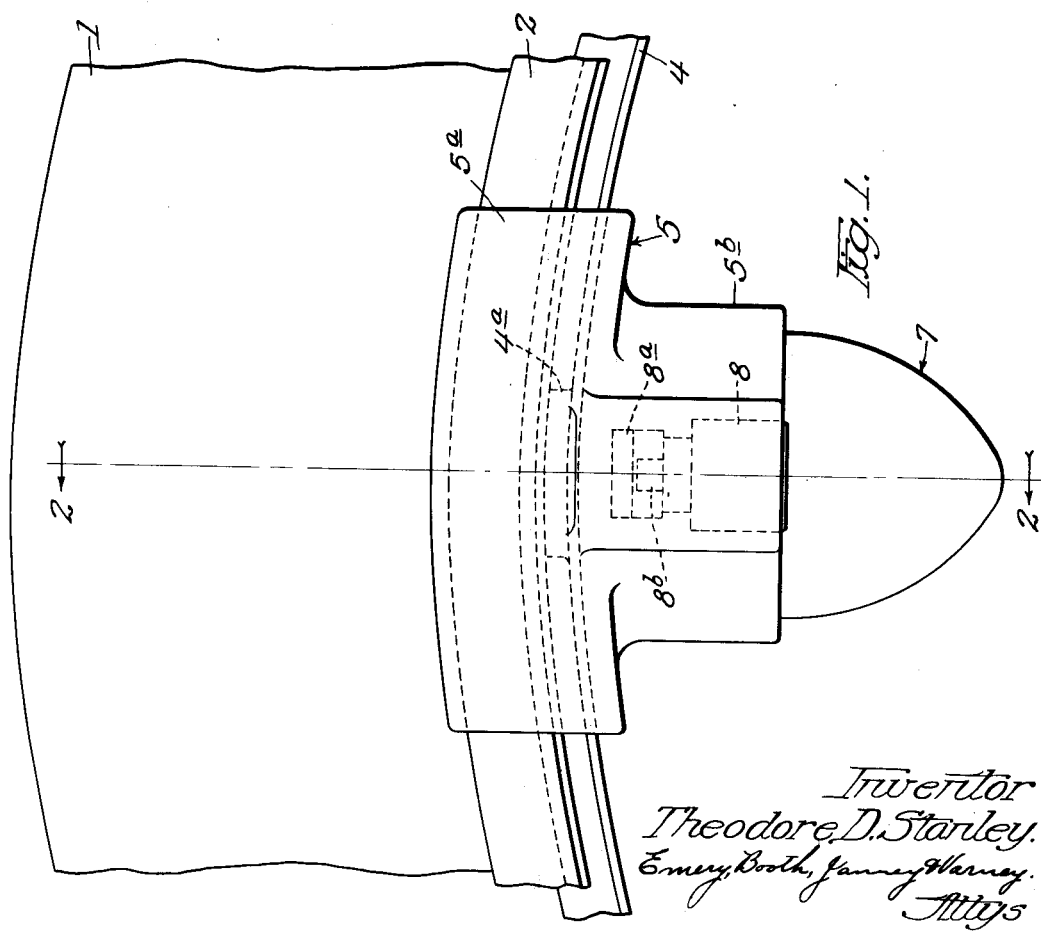
Inventor
Theodore D. Stanley.
Emery, Booth, Janney & Varney.
Attys Patented Mar. 24, 1925.

1,531,149

UNITED STATES PATENT OFFICE.

THEODORE D. STANLEY, OF DETROIT, MICHIGAN, ASSIGNOR, BY MESNE ASSIGNMENTS, TO ROBERT H. BUTTERS, OF ATLANTA, GEORGIA.

AUTOMOBILE TIRE LOCK.

Application filed January 12, 1920. Serial No. 351,035.

*To all whom it may concern:*

Be it known that I, THEODORE D. STANLEY, a citizen of the United States, residing at Detroit, in the county of Wayne and State of Michigan, have invented an Improvement in Automobile Tire Locks, of which the following is a specification.

This invention relates to means for locking pneumatic vehicle tires to prevent their unauthorized removal.

One illustrative construction containing an embodiment of the invention is shown for example in the accompanying drawings; the purpose of the illustrative embodiment of the invention being to lock the spare tire of an automobile to a supporting rack or holder which in this instance typifies a carrier rim on which the tire is mounted.

In said drawings:

Fig. 1 is a front elevation of a segment of the spare tire and rack with associated features of the invention.

Fig. 2 is a vertical cross-section of the same.

The drawings indicate an inflated spare tire 1, fitted to a demountable wheel rim 2, and having the usual protruding valve stem 3 connected with the inner air tube of the tire.

The tire with its associated wheel rim is mounted on a rack or holder carried usually at the rear of the car. The holder in this instance comprises an annular carrier rim 4 supporting the assembled wheel rim and tire internally and typifying any support or holder on which the tire may be mounted. The form of carrier rim shown being formed with a boss or protuberance 4ª on its upper side and with suitable bosses (not shown) at other points to engage the interior of the wheel rim. The carrier rim may be bracketed to the car body or chassis in any suitable way.

A fitting or casting 5 is shown secured to the inside face of the upper side of the carrier rim by means of a hollow bolt 6 which extends upwardly through a central boss of the fitting and is screwed into the boss 4ª of the carrier rim, clamping said fitting between the latter and the flange or head 6ª of the bolt. This hollow bolt receives the protruding valve stem 3, the bore of the bolt being preferably sufficiently larger than the external diameter of the valve stem to permit necessary play of the valve stem as the tire is canted in applying it to and removing it from the carrier rim. However, the tire may be applied to the carrier rim before attaching the fitting, in which event there need be only a slight clearance in the bore of the bolt 6. The fitting 5 is formed with front and rear upwardly extending guard flanges 5ª which straddle the rim so as to prevent any turning movement of the tire thereon. The fitting is also formed with a depending wall or housing 5ᵇ. The structure thus described, in which the fitting 5 may become a part of the tire holder, broadly typifies holding means to receive the valve stem of the tire.

It will be understood that in applying the tire to the carrier rim of the illustrative construction, the tire should be held sufficiently high to permit inserting the valve stem through the boss 4ª, whereupon the tire is lowered while at the same time its lower part is forced inwardly around the lower part of the carrier rim. In removing the tire, its lower part is displaced from a carrier rim and the tire in such canted position is then lifted to withdraw the valve stem from the holding structure.

In order to secure the tire firmly to the holder, and to prevent its unauthorized removal, there is provided a cap 7 adapted to be screwed over the valve stem to fasten it in the holding structure, together with associated locking means releasable only by the owner of the car. In the illustrative construction, the cap 7 fits within the lower housing of the fitting 5 over the valve stem, and the cap is formed with an inwardly projecting tubular part 7ª which is internally threaded to engage the threads of the valve stem. The cap is screwed upon the valve stem until its rim engages the under surface of the fitting 5, thus clamping the tire to its seat on the boss 4ª on the carrier rim. The cap 7 thus typifies both a valve stem fastening means and an enclosure for the interfastened valve-stem and nut 7ª.

For locking the cap, there is provided a cylinder lock 8 or other suitable lock the unlocking action of which is exclusively within the control of the driver of the car. In this instance the lock is set in a housing formed on the depending wall 5ᵇ of the fitting 5, and has a sliding latch or lock bolt 8ª engaging a notch in the rim of the cap. As is well known, the type of lock referred to comprises a rotatable cylinder controlled by pin detents, the cylinder being provided with an eccentric pin 8^b engaging a cross-slot in the lock bolt for operating the latter by the turning of the cylinder by the key. Insertion of the proper key frees the cylinder from its pin detents and permits it to be turned by the key in a direction to withdraw the lock from the notch in the cap. The cap may then be unscrewed and the tire readily removed.

With the illustrative construction it is impossible to obtain access to the valve stem and associated parts until the cap is unlocked and unscrewed from the valve stem, and as the lock cannot be picked there is substantially no danger of theft of the tire as is so easily possible where the tire is secured by an ordinary chain and pad lock.

Furthermore, the inaccessibility of the tip of the valve-stem renders it impossible to deflate the tire by opening the valve; consequently danger of theft by deflation and forcible removal of the outer shoe of the tire from the wheel-rim is substantially eliminated, since it is impossible to deflate the tire sufficiently for such removal except by substantially damaging the tire by cutting or punching. The closure of the valve-stem by the cap is also an effective protection against dust.

Obviously the present invention is not limited to any particular form of construction and the details of the illustrative construction may be variously modified. Moreover it is not indispensable that all the features of the invention be used conjointly as they may be used to advantage in various different combinations and subcombinations.

I claim:

1. The combination of a tire rack comprising an annular carrier-rim to support the tire internally, and having an opening to receive the valve-stem; and means to fasten and lock the tire on said rim, comprising a fitting applied to the inner side of the carrier rim having outwardly projecting flanges extending past the wheel-rim to which the tire is fitted, a fastening for said fitting, a cap enclosing said fastening, and locking means for said cap.

2. A device of the class described comprising, in combination, a lock-housing member and a cooperative member detachably connectible therewith; said lock-housing member containing a lock and lock-controlled means for engagement with said other member to lock the two members in place; one of said members adapted to be attached to the inner side of a tire holder and having an opening to receive the valve-stem of the tire, and the other member adapted to provide a cap or cover for the valve-stem; one said member adapted for attachment to the valve-stem.

3. A device for locking a pneumatic tire to a tire holder, comprising separate parts adapted for locked connection and locking means therefor housed in one of said parts; one of said parts comprising a cap for enclosing the valve stem of the tire; and another said part adapted to be attached to the inner side of said tire holder before applying said cap and non-removable while the cap is applied and locked thereto; said last mentioned part having means cooperable with the tire holder to prevent rotation of said part.

4. A device for locking a pneumatic tire to a tire holder, comprising separate parts adapted for locked connection and locking means therefor housed in one of said parts; one of said parts comprising a cap for enclosing the valve stem of the tire; and another said part adapted to be applied to the inner side of said tire holder before applying said cap and non-removable while the cap is applied and locked thereto; said last-mentioned part having means cooperable with the tire holder and tire to prevent rotation of said part or turning of the tire about the axis of the valve stem.

5. A device for locking a pneumatic tire to a tire holder, comprising separate parts adapted for locked connection and locking means therefor housed in one of said parts; one of said parts adapted to be applied to the inner side of a tire holder and having flanges to straddle said holder and having an opening to receive the valve-stem of the tire; and the other part comprising a cap for enclosing the valve-stem; and means for securing one of said parts to the valve-stem.

6. A device for locking a pneumatic tire to a tire holder, comprising a lock-housing member and a cooperative member detachably connectible therewith; said lock-housing member containing a lock and lock-control means for engagement with said other member; one of said members adapted to be applied to the inner side of the tire holder and having an opening to receive the valve-stem of the tire, and the other member adapted to provide a cap or cover for the valve stem; and means enclosed within said members for fastening the first mentioned member to the tire holder independently of the cap.

7. A device for locking a pneumatic tire to a tire holder, comprising a fitting adapted to be applied to the inner side of the tire holder; a tubular bolt for securing said fitting to said tire holder, said bolt affording a passage for the protruding valve-stem of the tire; a cap interfitted with said fitting for enclosing said tubular bolt and valve-stem; and means for locking said cap to said fitting.

8. A device for locking a pneumatic tire to a tire holder, comprising a lock housing member adapted to be applied to the inner side of the tire holder, said member having an opening for the valve-stem of the tire and having a surrounding flange or wall; a cap adapted to fit within said flange or wall and having an internal nut for screwing on the valve-stem; said cap having a notched inner end; and locking means carried by said member including a locking bolt for engagement with the notched end of the cap.

9. In a tire lock, the combination with a tire valve stem, of a tubular body adapted to engage over the valve stem, a member rotatable on the body and having a screw-thread engagement with the valve stem, and manually releasable means for positively locking said rotatable member against rotation.

10. In a tire lock, the combination with means supporting a tire and having an aperture through which the tire valve stem projects, a non-rotatable body engaging over the valve stem and adapted to contact said supporting means, means rotatable on the body and having a screw-thread engagement with the valve stem, and means positively locking said rotatable means against rotation, to prevent a removal of the tire from the supporting means.

11. A device of the class described comprising, in combination, a separable housing adapted to receive the valve stem of a pneumatic tire; an internally threaded tubular part carried by and enclosed within said housing for engaging the valve stem to fasten it in said housing; and means for locking said housing in non-separable condition.

12. A device for locking a pneumatic tire to a tire holder, comprising a member applicable to the inner said of said holder having a portion to surround the valve-stem of the tire and a projecting portion or portions to cooperate with the tire; a valve-stem cap adapted for locked connection with said member; means for locking said cap to said member; and valve-stem engaging means within said cap whereby said member is held in place and the tire fastened to said holder.

In testimony whereof, I have signed my name to this specification.

THEODORE D. STANLEY.